United States Patent [19]

Heffner et al.

[11] 3,921,079

[45] Nov. 18, 1975

[54] MULTI-PHASE CLOCK DISTRIBUTION SYSTEM

[75] Inventors: Samuel T. Heffner, Villa Park; Ronald F. Kowalik, Lombard, both of Ill.

[73] Assignee: GTE Automatic Electric Laboratories Incorporated, Northlake, Ill.

[22] Filed: May 13, 1974

[21] Appl. No.: 469,150

[52] U.S. Cl. .................. 328/62; 307/262; 307/269; 328/105; 328/155

[51] Int. Cl.² ........................ H03K 1/12; H03K 3/04

[58] Field of Search ...... 307/208, 262, 269; 328/55, 328/62, 63, 72, 74, 75, 105–106, 155; 331/45, 60

[56] References Cited

UNITED STATES PATENTS

| | | | |
|---|---|---|---|
| 3,290,606 | 12/1966 | Rodner | 328/62 |
| 3,422,359 | 1/1969 | Ladd, Jr. et al. | 328/62 |
| 3,551,822 | 12/1970 | McNelis | 328/62 |
| 3,590,280 | 6/1971 | Hudson et al. | 328/62 |
| 3,633,113 | 1/1972 | Grubel | 328/62 |
| 3,725,793 | 4/1973 | Phillips | 328/63 |
| 3,833,854 | 9/1974 | Shonover | 328/62 |

*Primary Examiner*—Stanley D. Miller, Jr.
*Attorney, Agent, or Firm*—James V. Lapacek

[57] ABSTRACT

A multi-phase clock distribution system is provided for distributing M sets of N phase clock signals where each of the M sets is offset in phase relative to one another by a sub-multiple of the period of the driving signal frequency. Each clock phase output includes a state decoder counting circuit preceeded by a phase shift adjust circuit which provides an incremental phase shift whereby each of the M × N phase clock output signals can be individually adjusted in phase.

11 Claims, 5 Drawing Figures

MULTI-PHASE CLOCK DISTRIBUTION SYSTEM

BACKGROUND OF THE INVENTION

1. Field of the Invention

The present invention relates generally to the field of digital electronics and communications and more particularly to a multi-phase clock distribution system having a plurality of outputs each of which is individually adjustable in phase.

2. Description of the Prior Art

The use of multiple phase clock systems in complex memory, communication and computer systems provides a potential in both real time usage and hardward efficiency. In high speed systems the problem of maintaining precise interclock timing relationships is complicated by the variations in component delay characteristics. Clock distribution systems of the prior art utilizing variable phase shifts and delay techniques are shown in U.S. Pat. No. 3,590,380 which issued to J. R. Hudson on June 29, 1971 and U.S. Pat. No. 3,633,113 which issued to S. J. Grubel et al on Jan. 4, 1972. Various other variable delay pulse generator circuits of the prior art are shown in U.S. Pat. No. 3,314,013 which issued to J. Dirac et al on Apr. 11, 1967, U.S. Pat. No. 3,675,047 which issued to R. E. Bahlstrom et al on June 7, 1971 and U.S. Pat. No. 3,725,793 which issued to E. G. Phillips on Apr. 3, 1973. The precise timing relationships required by sophisticated electronic systems of the present day and also of the future require clock distribution circuits wherein the effects of component delays are minimized through an adjustment procedure which does not alter the output pulse rate or width.

OBJECTS AND SUMMARY OF THE INVENTION

Accordingly it is a principal object of the present invention to provide a multi-phase clock distribution system utilizing a phase shift adjustment circuit in each phase clock chain preceeding the phase output countdown circuitry thereby providing phase adjustability which is inherently free from period, pulse width or edge distortion and producing clock signals with precisely determined leading and trailing edges;

Another object is a clock distribution system that provides a plurality of phase related clock signal sets where each of the sets or pulse trains in offset in phase relative to one another by a sub-multiple of the period of the driving signal frequency;

Another object is a clock distribution system having a phase shift adjust circuit which provides a selectable set of steps of delay whereby the desired time delay can be selected by programming the required number of steps;

Another object is a clock distribution system which utilizes a control bus that may be driven from a phase comparator or a central processor unit operating on an automatic basis that carries the phase identity and adjustment information for each phase in the system so that an advance, no change or retardation may be accomplished during successive time frames of the phase clock signals or pulse trains.

These and other objectives of the present invention are efficiently achieved by providing phase shift adjust circuits driven by a clock signal frequency for selectively delaying the edges of the clock waveform input whereby each phase adjust circuit may be programmed to select the desired amount of phase adjustment, and state decoder counting circuits arranged so that each phase shift adjust circuit drives a state decoder counting circuit with each state decoder counting circuit having an output that is phase related to the other state decoder counting outputs as defined by a multiple of the clock period and by the selected delay in each phase adjust circuit.

Other objects will appear from time to time in the ensuing specification, drawings, and claims.

DESCRIPTION OF THE PREFERRED EMBODIMENT

Figure 1:
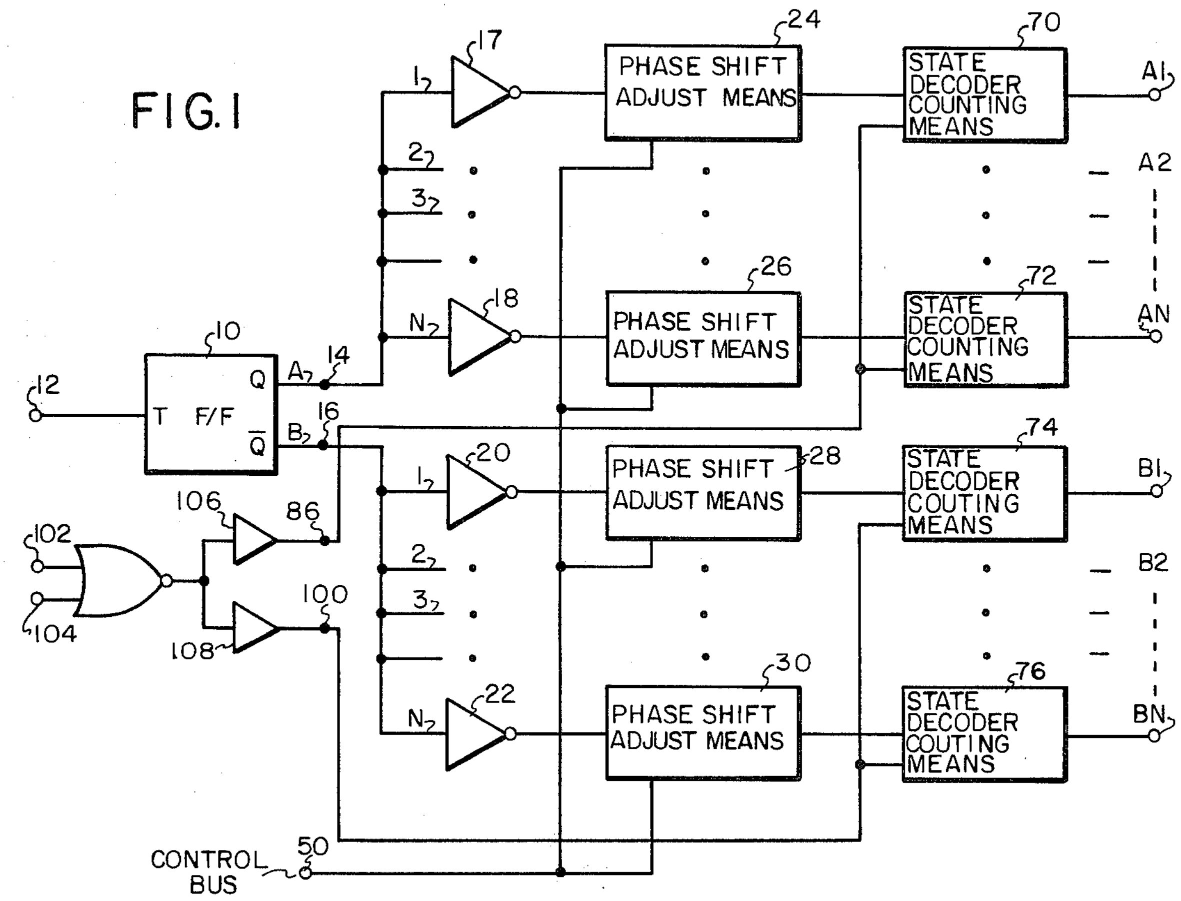
FIG. 1 is a schematic block diagram of the clock distribution circuit of the present invention.

The clock distribution circuit of the present invention as shown in FIGS. 1 through 5 includes a preliminary counting circuit stage 10 which is driven by the input clock signal at terminal 12. The input clock signal at terminal 12 is a pulse signal as shown by the waveform representation in FIG. 5 which may be crystal controlled or synchronized to an external reference source. The preliminary counting stage 10 provides the basic offset clock trains whose number is determined by the requirements of the system in which the clock distribution circuit is utilized. The detailed circuitry of the preliminary counting stage 10 will then vary according to the number of offset clock trains to be generated. The embodiment shown in FIG. 1 delivers two offset clock trains and the preliminary counting stage 10 is a flip-flop with the two offset phase outputs at terminals 14 and 16 with waveforms shown in FIG. 5. The two phases, the A phase at terminal 14 and the B phase at terminal 16, are inversely related in phase such that they are out of phase by one half the period of the output frequency of flip-flop 10. The output frequency of flip-flop 10 is one half the input frequency of the input clock signal at terminal 12. It should be understood however that the preliminary counting stage 10 may have any number of outputs M where M is an integer greater than one where the various outputs would be offset in phase by 1/M period of the clock frequency at the output of the counting stage 10. For example if M equals 4, the four outputs of the preliminary counting stage 10 would be offset by one quarter of a period which would correspond to a full period at the input clock signal frequency at 12 and the preliminary counting stage 10 would then essentially perform a divide by four function.

Figure 5:
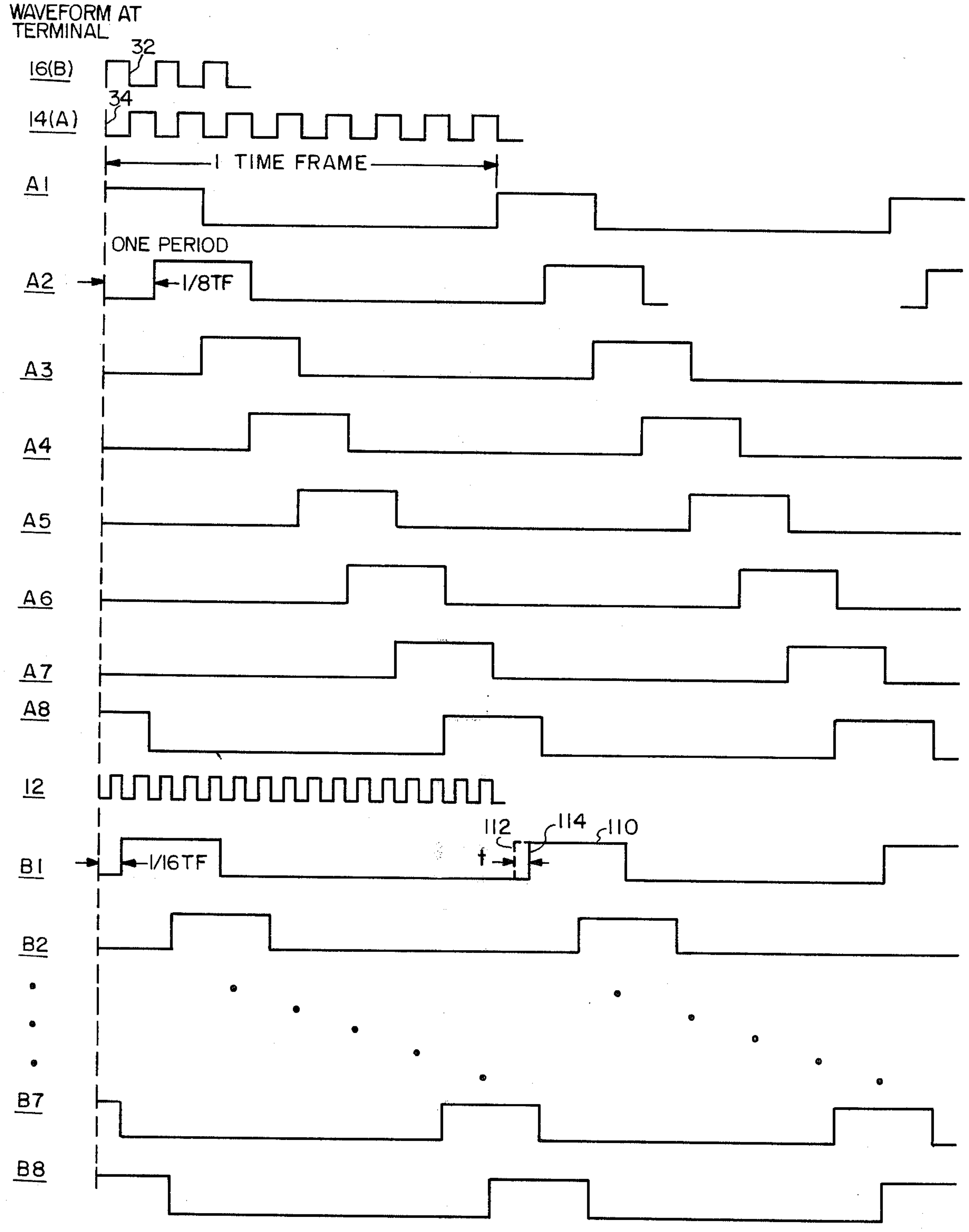
FIG. 5 is a representation of various waveforms generated by the clock distribution system of FIG. 1.

Each of the two phase outputs at 14 and 16 drive N lines where N is an integer greater than one corresponding to the N phase clock output signals of the system. For example, whereas in the present embodiment there are two offset clock trains A and B, there are two N phase clock output signals of the clock distribution system. More generally there are M × N phase clock output signals. Each of the N lines driven by outputs 14 and 16 of the preliminary counting stage 10 includes an inverter stage such as inverters 16 and 18 in the A phase chain and inverters 20 and 22 in the B phase chain with the remaining inverter stages and output chains omitted in FIG. 1 for clarity. The outputs of the inverters such as 16, 18, 20 and 22 drive phase shift adjust circuitry means 24, 26, 28 and 30 respectively as do the remaining inverter stages which are not shown. The phase shift adjust means 24, 26, 28 and 30 provide the desired incremental phase shift as measured from the trailing edges of the offset output clock waveforms at 14 and 16 such as trailing edge 32 of the B waveform at terminal 16 as shown in FIG. 5 and the trailing edge 34 of waveform at terminal 14. The phase shift circuitry means such as 24 may be implemented in numerous ways such as a controlled ramp generator or a multi-tap delay line although it should be understood that the exact circuitry used is not critical to the clock distribution circuit of the present invention. One specific embodiment of the phase shift adjust circuitry means that may be utilized is shown in more detail in FIGS. 2 and 3 and described in more detail in co-pending application Ser. No. 433,641 filed on Jan. 16, 1974.

Figure 2:
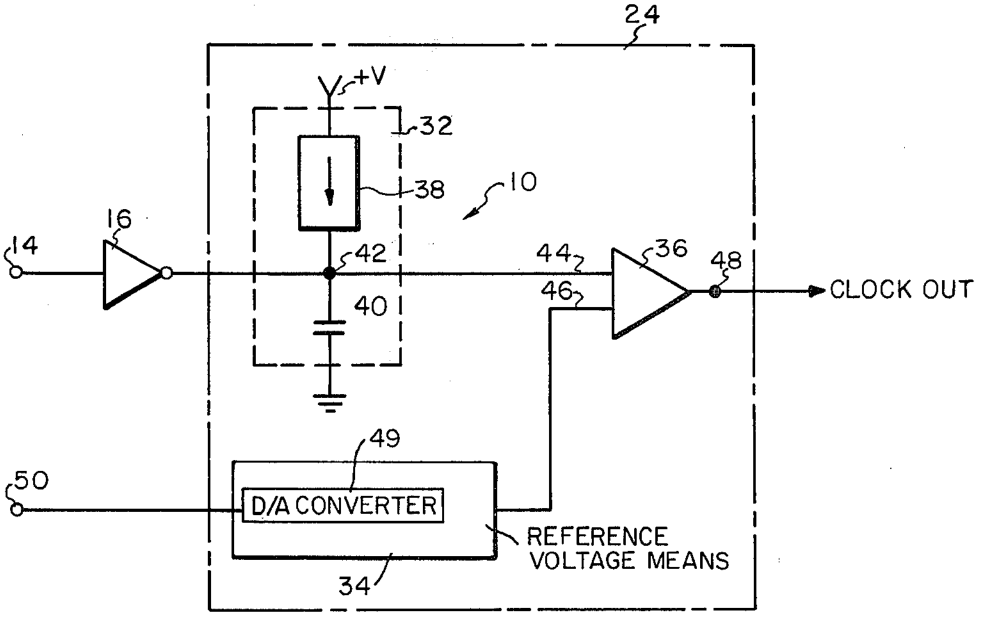
FIG. 2 an electrical schematic diagram of a particular embodiment of the phase shift adjust circuit of the clock distribution system shown in FIG. 1.

The phase shift adjust means or pulse edge delay circuit 24 of FIG. 2 includes a ramp generator stage 32 which generates ramp voltages, reference voltage means 34 and a voltage comparator stage 36. The ramp generator 32 further includes a constant current source 38 and a capacitor 40. The capacitor 40 and the constant current source 38 generate a ramp voltage at their junction 42 which is the output of inverter stage 16 when the constant current source charges the capacitor. The inverter stage 16 when utilized in conjunction with the phase shift adjust means 24 of FIG. 2 comprises an open collector inverter gate.

The voltage comparator stage 36 has a first input 44 connected to the junction of current source 38 and capacitor 40, a second input 46 coupled to the output of the reference voltage means 34 and an output 48 which is the delayed pulse output of the phase shift adjust means 24. Reference voltage means 34 in a specific embodiment includes a multi-bit digital to analog converter stage 49 which is programmed by input control bus 50 which provides the particular digital input conditions to the digital to analog converter to provide the desired output conditions at input 46 to the comparator stage 36. Discrete reference voltage levels as converted from the phase identity adjustment information on the digital control bus line 50 are then applied to the voltage comparator stage 36.

Figure 3:
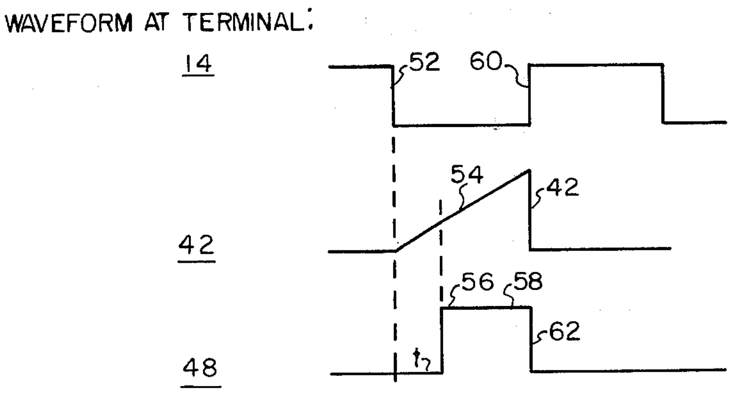
FIG. 3 is a representation of various waveforms generated throughout the circuitry of FIG. 2.

In operation, ramp generator stage 32 is responsive to the clock edges of the incoming clock pulses through open collector inverter gate 16 to control the charging and discharging of capacitor 40 of the ramp generator stage 32 to initiate and terminate the ramp voltage generation. As shown in FIG. 3, when an incoming clock pulse is received at input 14 of inverter 16, capacitor 40 is discharged to approximately a zero voltage level. When the trailing edge 52 of the incoming clock pulse occurs, the output of the inverter gate 16 allows capacitor 40 to be charged by constant current source 38 to initiate the generation of the ramp voltage as shown as edge 54 of the waveform at terminal 42. The inverter gate 16 on successive input clock pulse edges alternately initiates and terminates the ramp voltage generations.

The ramp voltage continues to increase until the ramp voltage delivered to input 44 of comparator stage 36 bears a predetermined relation to the reference voltage at input 46 supplied from the reference voltage means 34. In this embodiment the predetermined relation is equality. At this point, shown as edge 56 of the waveform at terminal 48 in FIG. 3, the voltage comparator stage 36 changes state and provides a clock edge which is delayed from the trailing edge 52 of the incoming clock pulse. Because ramp generator 32 generates a linear voltage ramp, the time delay labeled $t$ of waveform 48 as measured between the delayed clock edge 56 and the trailing edge 52 of the input clock pulse is proportional to the reference voltage at input 46 of voltage comparator 36 supplied by the reference voltage means 34. The output level 58 of the waveform at terminal 48 of comparator 36 remains at high level until the next clock edge 60 of the input 14 occurs whereupon the capacitor 40 is discharged back to a zero voltage level as shown by edge 62 of the waveform at terminal 42. The output of the comparator stage 36 then returns to a zero level as shown by edge 62 of the waveform at terminal 48. This sequence of events is repeated upon successive clock edges of the input clock at terminal 14.

From the foregoing, it can be seen that the phase shift adjust means 24 of the embodiment described in FIGS. 2 and 3 provides a clock pulse edge delay circuit which is programmable to provide a plurality of discrete pulse edge time delays. Any one of a plurality of discrete time delays may be selected by appropriately conditioning the digital inputs as controlled by 50 of the digital to analog converter within reference voltage means 34.

Now referring back to FIG. 1, the output at terminal 48 of the phase shift adjust means 24 is then coupled to state decoder counting means 70. Each of the M × N output clock signal lines includes state decoder counting means as represented by stages 72, 74 and 76 which are driven by phase shift adjust means 26, 28 and 30 respectively. The state decoder counting means of the present invention provide the N phase clock outputs of each offset clock train M wherein each of the N phase clock outputs are offset from one another in time by one half of the clock input period at terminals 14 and 16, the outputs of the preliminary counting stage 10.

Figure 4:
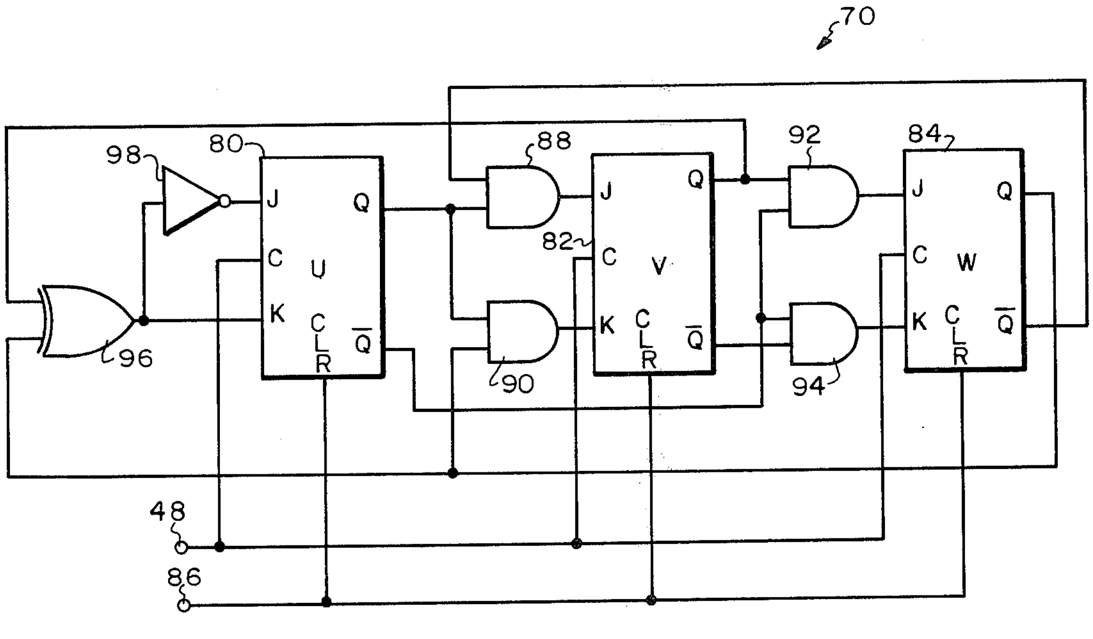
FIG. 4 is a more detailed schematic diagram of the state decodor and counting circuitry of the clock distribution system of FIG. 1.

In a particular embodiment as shown in FIG. 4, where N is equal to 8, and an Eight State Grey Code Counter is utilized to produce the eight phase clock output signals for each offset clock train as will be explained in detail hereinafter. The Grey Code Counter as shown in FIG. 4 is of conventional design and is especially useful since this type of circuit has only one flip-flop that changes state for each clock count thereby eliminating false output transients due to different switching times in the flip-flops included in the counter stage. The Grey Code Counter such as 70 includes three flip-flop stages 80, 82 and 84 which are denoted as the U, V and W stages respectively. Each of the clock inputs of flip-flops 80, 82 and 84 is connected to the output 48 of the phase shift adjust means 24. Similarily the clear inputs of the three flip-flops are connected to a synchronization control line 86 which provides common control access for functions such as master-start and resynchronization on detection of a fault condition. Flip-flops 80 and 82 are interconnected by two joint input AND gates 88 and 90. The Q output of flip-flop 80 is connected to one input of AND gate 88 and one input of AND gate 90 with the output of AND gate 88 connected to the J input of flip-flop 82 and the output of AND gate 90 connected to the K input of flip-flop 82. The second input of AND gate 88 is connected to the $\overline{Q}$ output of flip-flop 84 and the second input of AND gate 90 is connected to the Q output of flip-flop 84. Further the flip-flop 82 is interconnected to flip-flop 84 by two input AND gates 92 and 94 with the $\overline{Q}$ input of flip-flop 82 connected to one input of AND gate 92 and the Q output of flip-flop 82 connected to one output of AND gate 94. The second inputs of AND gates 92 and 94 are connected to the $\overline{Q}$ output of flip-flops 80. The output of AND gate 92 is connected to the J input of flip-flop 84 and the output of AND gate 94 is connected to the K input of flip-flop 84. To complete the connection of the state decoder counting means from 70 as a Grey Code Counter, the Q output of flip-flop 84 is connected to one input of a two input exclusive OR gate 96 whose output is connected to the K input of flip-flop 80. The second input of OR gate 96 is connected to the Q output of flip-flop 82. The output of OR gate 96 is also connected to the J input of flip-flop 80 through an inverter gate 98. The circuitry shown in FIG. 4 represents the configuration that is common to all the M × N state decoder counting means as represented in FIG. 1 by 70, 72, 74 and 76 with the remaining state decoder counting means not shown for clarity.

Referring now to FIG. 1, the synchronization line 86 previously discussed is distributed to the N or, in this embodiment, eight stages of the state decoder counting means as represented by 70 and 72. Similarly, synchronization line 100 is provided for the B offset phase clock output signals and is distributed to the state decoder counting means as represented by 74 and 76. The synchronization control inputs 102 and 104 are connected to the inputs of a NOR gate whose output is connected to the inputs of two inverter gates 106 and 108. The output of inverter 106 forms the synchronization line 86 for the A offset phase clock outputs and the output of inverter 108 forms the synchronization line 100 for the B phase offset clock pulses. The N clock pulse outputs of the A phase offset clock trains are labeled Al through AN in FIG. 1 which in this particular embodiment is Al through A8, and the N clock outputs of the B offset clock trains are labeled B1 through BN or in this particular embodiment B1 through B8. The various output waveforms A1 through A8 and B1 through B8 are shown in FIG. 5 with their appropriate phase offsets. Each of the particular outputs A1 through A8 and B1 through B8 are derived from the various state decoder counting means stages by the appropriate combining of Q and $\overline{Q}$ outputs of the flip-flops U, V, and W or 80, 82 and 84 as defined by the Eight State Grey Code. For example the zero phase output which forms the A1 output is obtained by combining the $\overline{Q}$ output of the V flip-flop and the $\overline{Q}$ output of the W flip-flop by an AND gate which may be written in logic notation as $\overline{V}\overline{W}$. Similarly the remaining A and B outputs can be defined in logic notation and accomplished by proper combinations of the Q and $\overline{Q}$ outputs of the U, V and W flip-flops each by an AND gate with the resultant logic notation as listed in the following table:

| | |
|---|---|
| 1 | U $\overline{W}$ |
| 2 | V $\overline{W}$ |
| 3 | $\overline{U}$ V |
| 4 | V W |
| 5 | U W |
| 6 | $\overline{V}$ W |
| 7 | $\overline{U}$ $\overline{V}$ |

As can be seen from FIG. 5 the A1 and A2 outputs are offset in phase by one period of the clock frequency at 14, 16 the outputs of the preliminary counting stage 10. In this particular embodiment this corresponds to two periods of the input clock signal at terminal 12 to the clock distribution system. Further, the remaining A3 through A8 outputs are offset one from the other by a period of the clock frequency at 14, 16. Due to the inverse phase relationship between the A offset train at output 14 and the B offset train at output 16 the A1 and B1 outputs are offset in phase from each other by one half of the period of the clock frequency at 14, 16. Similarly the B1 through B8 outputs are offset in phase one from another by one period of the clock frequency. The first pulse output on each of the lines A1 through A8 and B1 through B8 are shown in their nondelayed pulse train positions where the phase shift adjust means 24 through 30 are programmed for zero phase delay. The second output pulse 110 of the B1 waveform of FIG. 5 is shown with a delay programmed into the phase shift adjust means 28 with an edge delay of time *t* between the normal positioned leading edge 112 and the delayed leading edge 114. Similarly each of the M × N, or in this particular embodiment each of the 16 phase shift adjust means, may be programmed independently to produce the particular edge delay time required for appropriate system functions. The particular control lines in the control bus group 50 are then programmed from time frame to time frame of complete offset pulse trains such that each leading edge is maintained in phase or advanced or retarded individually from each of the other outputs as required by the system control utilizing the clock distribution system. In the particular embodiment shown the edge delay may be programmed to a maximum of one half the period of the clock frequency at 14, 16 which corresponds to one sixteenth of the complete time frame for the 8 pulses. It should also be noted that since each state decoder counting means is individual from the other stages, the pulse rate and pulse width is maintained for each clock phase output such as the pulse 110 in the B1 waveform.

The clock distribution system of the present invention then provides for distribution of M sets of N phase clock signals where each of the M sets is offset in phase relative to one another by a sub-multiple of the period of the signal frequency outputs of the preliminary counting stage. By the use of phase adjustment circuitry in each phase clock chain prior to the state decoding circuitry, a phase adjustability which maintains a constant period or pulse width is provided, which is inherently free from pulse width or edge distortion of the clock signal. Further, the control system utilized to program the clock distribution system of the present invention may be arranged to program the desired phase delay in each individual time frame for each particular phase clock output with the exact phase delay programmed being accomplished by digital programming to provide a discrete number of selectable delay steps providing precise control of the phase delay.

Whereas the preferred form of the invention has been shown and described herein, it should be realized that there may be many substitutions, modifications and alterations thereto without departing from the teaching of this invention.

Having described what is new and novel and desired to secure by letters patent, what is claimed is:

1. A multi-phase clock distribution circuit driven by a signal frequency source for generating N outputs, where N is an integer greater than one, each of said N outputs producing a pulse in a pulse train where each pulse in the pulse train is related to any other pulse by a multiple period of the source signal frequency, said clock distribution circuit comprising:

phase shift adjust circuitry means (PAM) driven by said signal frequency for selectively delaying an edge of said signal waveform input, each of said N output chains including a PAM, each of said PAM being programmable to select the desired phase adjustment for each of said N outputs, said PAM including ramp generator circuitry means for generating a ramp voltage, reference voltage means for generating a reference voltage upon being programmed to select a specific reference voltage and ,comparator circuitry means for comparing said ramp voltage and said reference voltage for generating a pulse output, said pulse output continuing from the time said ramp voltage equals said reference voltage until the next successive edge of said signal frequency source occurs, and state decoder counting circuitry means (SDCM) driven by said PAM for generating an output, each of said PAM driving one of said SDCM, each SDCM having an output that is phase related to said other SDCM outputs by a multiple of the period of said source signal frequency and said selected delay in said PAM, each SDCM output reproducing the phase delay selected in said PAM driving said SDCM.

2. The clock distribution circuit as recited in claim 1 wherein each successive output of said N outputs is offset in phase by one period of said source signal frequency from said preceeding output forming a pulse train on said N output lines.

3. The clock distribution circuit as recited in claim 2 wherein said SDCM includes a divide by N circuit.

4. The clock distribution circuit as recited in claim 1 wherein said reference voltage means includes a digital to analog converter that is digitally programmed, said digital programming inputs selecting a discrete reference voltage to be produced at the output of said reference voltage means and applied to said comparator means.

5. The clock distribution circuit as recited in claim 1 wherein said SDCM includes a synchronization input to control the output synchronization of said SDCM output pulses.

6. A multi-phase clock distribution circuit driven by a signal frequency source of frequency F for generating M phase related output pulse trains, where M is an integer greater than one, each of said M output pulse trains including N phase related outputs, said clock distribution circuit comprising:

preliminary counting circuitry means for generating M phase related offset signal frequency outputs, each successive offset signal being offset in phase by 1/M periods of said source signal frequency from the next;

phase shift adjust circuitry means (PAM) driven by said offset signal frequency outputs for selectively delaying an edge of said offset signal outputs, each of said N output chains of said M pulse train sets including a PAM, each of said PAM being programmable to select the desired phase adjustment for each of said N outputs of said M sets of pulse trains; and state decoder counting circuitry means (SDCM) driven by said PAM for generating an output of said N outputs in said M offset pulse train sets, each of said PAM driving an SDCM, each SDCM having an output that is phase related to said other SDCM outputs in each of said M phase related offset signal pulse trains by a multiple of the period of said offset signal frequency and said selected delay in said PAM, each SDCM output reproducing the phase delay selected in said PAM driving said SDCM.

7. The clock distribution circuit as recited in claim 6 wherein each successive output of said N outputs in each of said M phase related output pulse trains is offset in phase by one period of said source signal frequency from said preceeding output forming a pulse train on said N output lines.

8. The clock distribution circuit as recited in claim 7 wherein said SDCM includes a divide by N circuit.

9. The clock distribution circuit as recited in claim 6 wherein said PAM includes ramp generator circuitry means for generating a ramp voltage, reference voltage means for generating a reference voltage upon being programmed to select a specific reference voltage and comparator circuitry means for comparing said ramp voltage and said reference voltage for generating a pulse output, said pulse output continuing from the time said ramp voltage equals said reference voltage until the next successive edge of said signal frequency source occurs.

10. The clock distribution circuit as recited in claim 9 wherein said reference voltage means includes a digital to analog converter that is digitally programmed, said digital programming inputs selecting a discrete reference voltage to be produced at the output of said reference voltage means and applied to said comparator means.

11. The clock distribution circuit as recited in claim 6 wherein said SDCM includes a synchronization input to control the output synchronization of said SDCM output pulses.

* * * * *